Sept. 26, 1950 A. L. GRAS 2,523,694
OPTICAL RECTIFIER FOR MOTION-PICTURE PROJECTORS
Filed Aug. 7, 1947 5 Sheets-Sheet 2

INVENTOR:
ANDRÉ LOUIS GRAS
BY
ATTORNEY

Sept. 26, 1950 A. L. GRAS 2,523,694
OPTICAL RECTIFIER FOR MOTION-PICTURE PROJECTORS
Filed Aug. 7, 1947 5 Sheets-Sheet 3

INVENTOR:
ANDRE LOUIS GRAS
BY
ATTORNEY

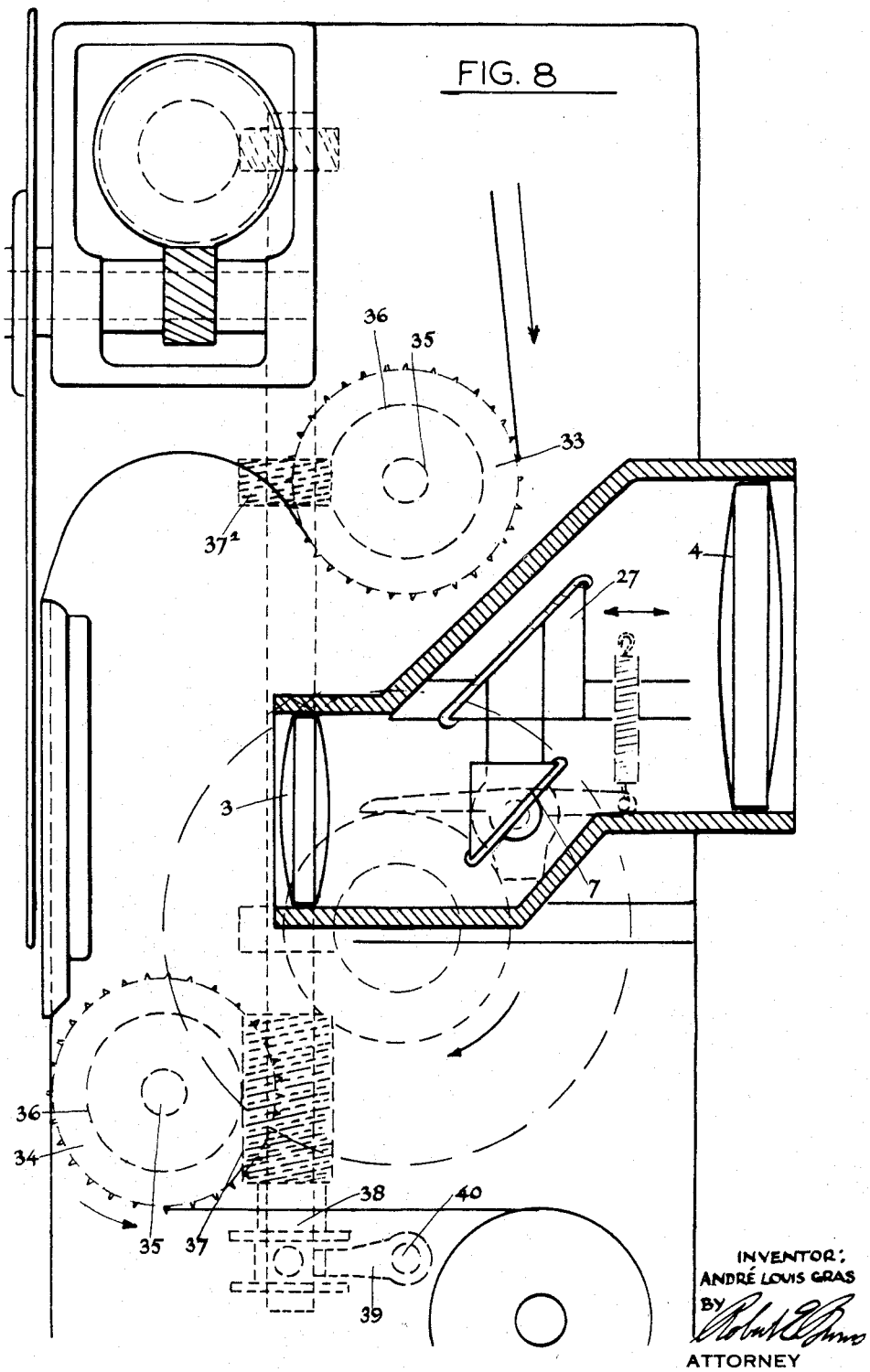

Sept. 26, 1950 A. L. GRAS 2,523,694
OPTICAL RECTIFIER FOR MOTION-PICTURE PROJECTORS
Filed Aug. 7, 1947 5 Sheets-Sheet 5

INVENTOR
Adrian Louis Gras
BY
ATTORNEY

Patented Sept. 26, 1950

2,523,694

UNITED STATES PATENT OFFICE 2,523,694

OPTICAL RECTIFIER FOR MOTION-PICTURE PROJECTORS

Adrien Louis Gras, Paris, France

Application August 7, 1947, Serial No. 767,132
In France July 9, 1946

Section 1, Public Law 690, August 8, 1946
Patent expires July 9, 1966

1 Claim. (Cl. 88—16.8)

There is known a type of motion picture projector in which film is moved continuously and the shutter mechanism is reciprocated so as to follow the film while it is being advanced one picture area.

Thus, a stationary image is projected on the screen whenever a frame is uncovered before the lens although the film is moved continuously.

This invention has for its object to provide a number of improvements relating to projectors of this type.

Therefore, it relates to a motion picture projector of the type in which the film is moved continuously, the projected image being held stationary on the screen by means of a prism or mirror assembly which follows the film while it is being advanced one picture area, characterized in that the prisms or mirrors are oscillated, the period of the oscillating motion being equal to the time of displacement of the film through a distance equal to one frame.

In one particular embodiment, the oscillating prisms or mirrors which produce a stationary image are positioned between the front and rear components of the lens, whereby the prisms or mirrors may have small dimensions, since the field is relatively small, and the prisms or mirrors may be oscillated at a high speed in view of their small dimension.

The oscillation of the prism or mirror is controlled by a rotary cam acting on an arm secured to the said prism or mirror. The arm and the prism or mirror are carried by a mounting which may be manually moved backwards or forwards in a single direction parallel to the optical axis of the lens so that the image is held stationary whatever the focal length of the lens may be, without altering the mean oscillating plane of the prism or mirror, such plane being tangent to the rotary cam and parallel to the optical axis of the lens.

The invention also provides a motion picture projector of the type described in which a disk shutter provided with a spiral slot is positioned behind the gate aperture and follows the film while it is being advanced one picture area, whereby the projected area of the film is limited, thus sensibly increasing the light efficiency since the dark periods are extremely short so that a very bright image is produced on the screen.

Referring to the drawings:

Fig. 8 is a diagrammatic view of a projection constructed in accordance with another embodiment of the invention.

Figure 1:
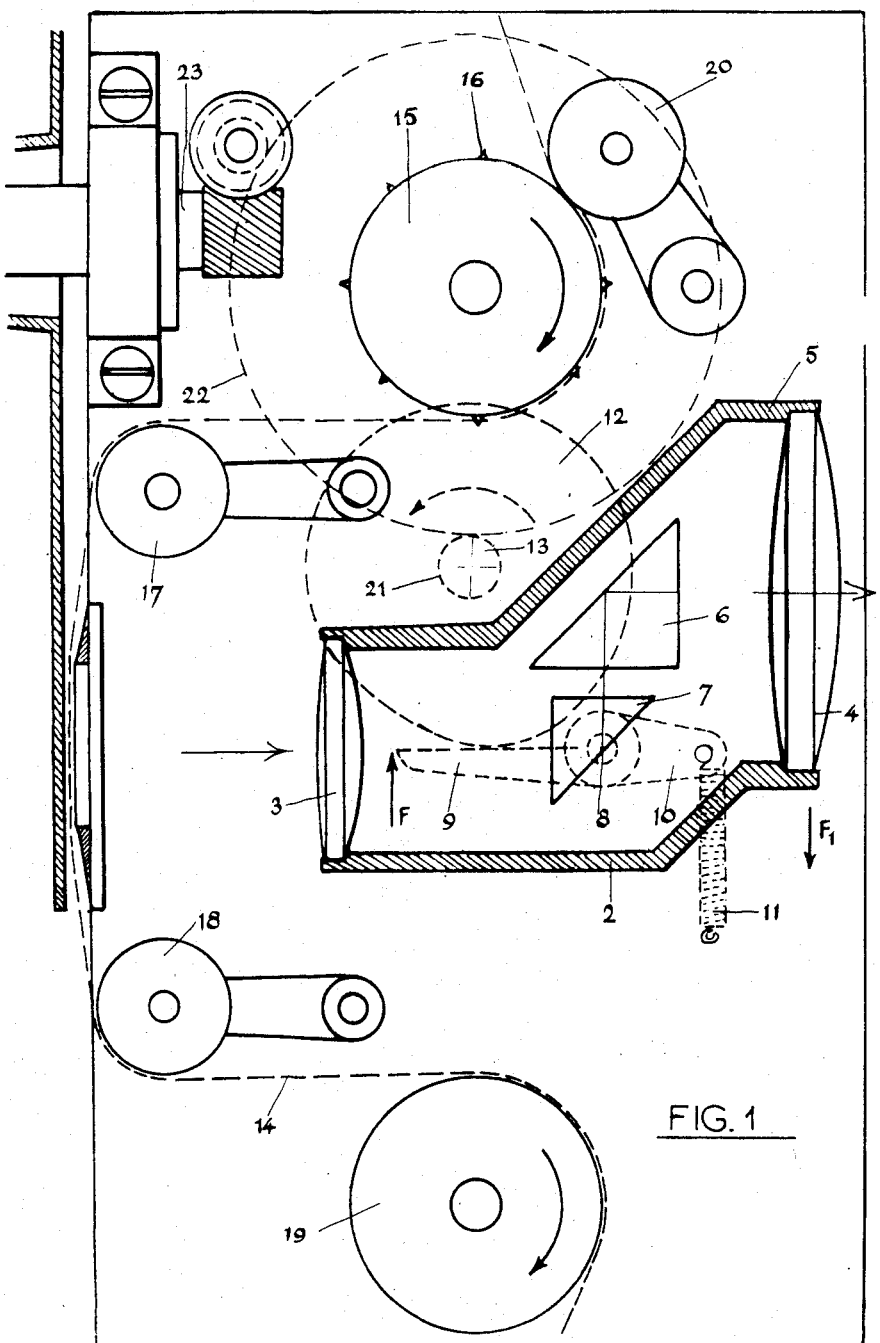
Fig. 1 is a diagrammatic view of one embodiment of the invention.

Referring to Fig. 1, the projector broadly comprises a window or film gate 1 before the lens 2 and a means for moving the film through the gate.

The lens 2 comprises two components 3 and 4 between which is formed a chamber 5 having mounted therein two oscillating prisms 6 and 7.

The prisms are oscillated as follows:

The prism may oscillate on a shaft 8 which is parallel to the reflecting face of the prism and extends along the middle line of this face.

One end of the shaft 8 carries an arm 9 and the other end of the shaft 8 carries a flange 10 which is normally displaced in the direction of the arrow $f_1$ by means of a spring 11.

The spring 11 always tends to engage the arm 9 with a suitably shaped cam 12 mounted on a shaft 13 and rotatable therewith.

When the cam is rotated, the arm 9 is rocked and rotates the shaft 8 and the prism 7.

The light rays coming from the gate 1 pass through the lens component 3 and are directed towards the prism 6 by the reciprocating prism 7.

The light rays are then deflected by the prism 6 towards the screen through the lens component 4.

The film 14 is moved continuously past the gate 1 and is followed by the oscillating prism 7 while it is being advanced one picture area so that the projected image is stationary on the screen.

The prism 7 is then moved back to its first position and starts again to follow the second frame moved through the gate and the cycle is repeated so that a succession of stationary images are projected onto the screen, which produces the usual motion picture effect.

The path of the film through the apparatus will now be briefly described.

The film 14 is drawn from a supply reel and passes on a sprocket 15 having teeth 16 meshing with the perforation holes of the film.

The film then passes on two rotating guide rollers 17 and 16 positioned at each end of the gate 1 respectively and on a rotating drum 19.

The film 14 is pressed against the sprocket 15 by means of a rotating pressure roller 20.

The prism controlling cam 12 is directly rotated by a power shaft carrying a gear 21 meshing with a gear 22. The gear 22 drives the shutter shaft 23 through a gear train.

The projector also comprises a shutter mechanism behind the gate 1 for limiting the projected area of the film.

This shutter mechanism preferably comprises a disk 24 rotating before the lens.

The disk 24 is provided with a spiral slot 25 and two shutter sectors 26. The spiral slot is shaped so as to ensure a correct framing of the projected image as the film is moving.

The spiral slot disk 24 is rotated by the film feeding mechanism so that the rotation of the disk is synchronized with the film motion and the oscillating period of the prism 7 which is also driven by the same motor as the film feeding mechanism.

By this arrangement, the dark periods may be extremely reduced, which noticeably increases the light efficiency and the brightness of the image on the screen.

The projector that has just been described has a number of advantages and, more particularly, the following:

1. The optical compensation necessary for obtaining stationary images is effected by means of a set of oscillating prisms or mirrors arranged between the projection lens components in the focal plane of those components, so that small prisms or mirrors may be used and an oscillation with a rapid back stroke may be obtained, which cannot be secured when the prisms are outside the lens since in the latter position the field is large.

Figure 10:
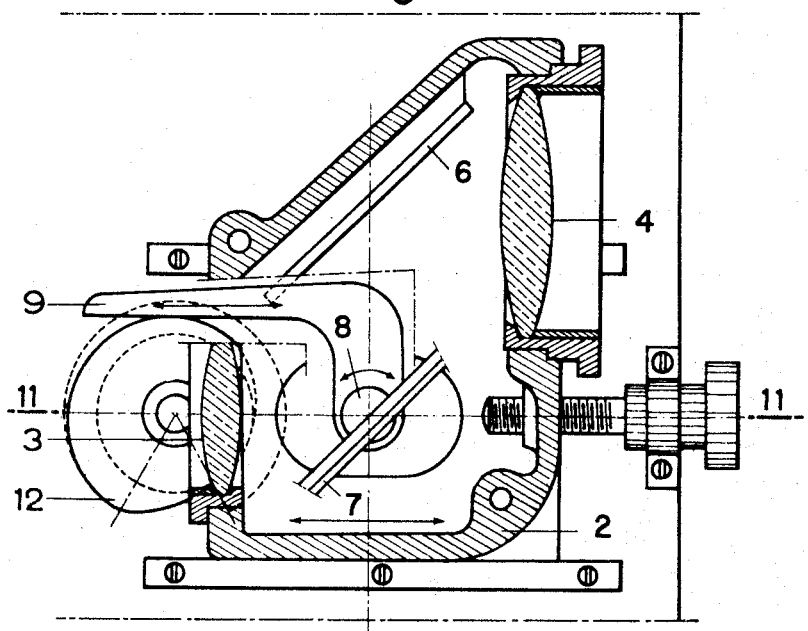
Fig. 10 is a vertical sectional view of the adjustable mounting for the mirror and its ratcheting arm showing the setting of the operating length of the oscillating mirror arm relative to the cam.
Figure 11:
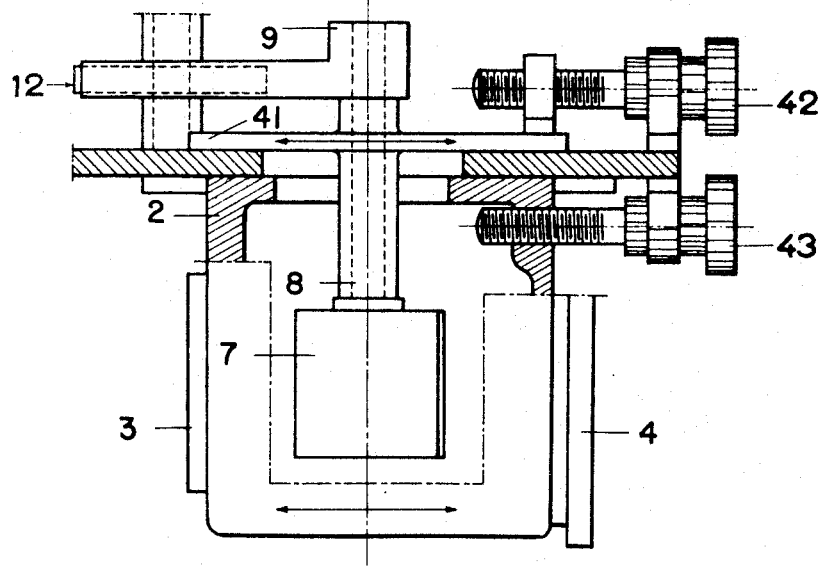
Fig. 11 is a plane sectional view along the line 11—11 of Fig. 10.

2. The prisms or mirrors and arms 9 are mounted on a bracket 41 which may be manually moved backwards or forwards in a single direction parallel to the axis of the lens by rotating the knob 48 for adjustments relatively to the cam so that the image is held stationary whatever the focal length of the lens may be, without altering the oscillating plane of the mirror. Such mounting means is shown in Figs. 10 and 11, where the knob 43 is the focusing knob of the lens.

3. The limitation of the projected area of the film is performed by a shutter provided with a spiral aperture and two extremely short shutter sectors, whereby a material increase in light efficiency is secured which results in a higher brightness of the image on the screen.

4. The projector is rendered much more compact.

Figure 2:
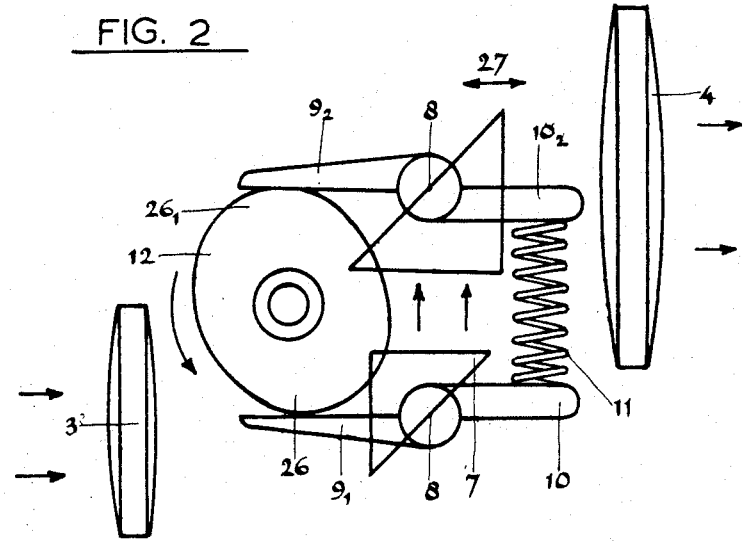
Fig. 2 is a view of the control mechanism of the reciprocating projection prisms.
Figure 3:
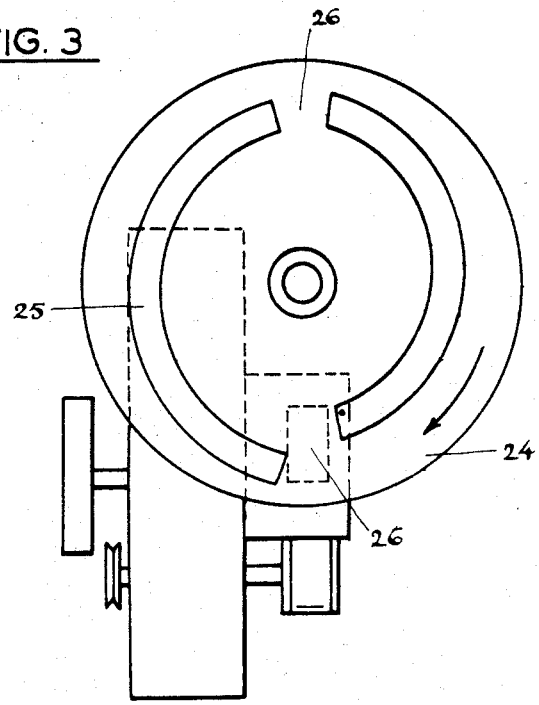
Fig. 3 is a view of a spiral slot disk shutter.

Various modifications may be made without in any way departing from the spirit of the invention. Thus, the oscillating prism may be replaced by two oscillating prisms 7 and 27 (Fig. 2). The two oscillating prisms are controlled in the above described manner. To this effect, each prism rotates on a shaft 8 which carries an arm $9_1$, $9_2$ respectively at one end, and, on the other end, a flange $10_1$, $10_2$ respectively.

The two flanges $10_1$, $10_2$ are connected by a spring 11. The arms $9_1$, $9_2$ are always engaged with a cam 12 comprising two bossings $26_1$, $26_2$, each corresponding to an arm $9_1$, $9_2$.

Figure 4:
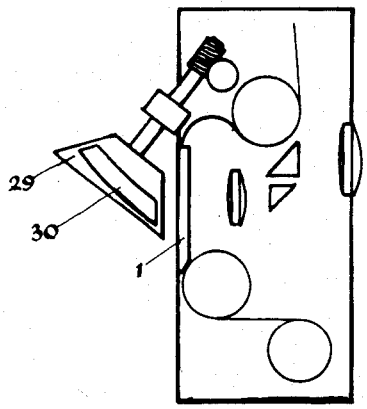
Fig. 4 is an end view of a spiral shutter member mounted on a cone.
Figure 5:
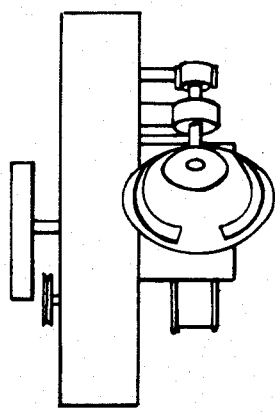
Fig. 5 is a front view of the parts shown in Fig. 4.

The shutter mechanism for limiting the projected area may comprise a cone frustum 29 provided with spiral apertures 30 (Figs. 4 and 5).

This shutter mechanism is positioned behind the film gate 1.

Figure 6:
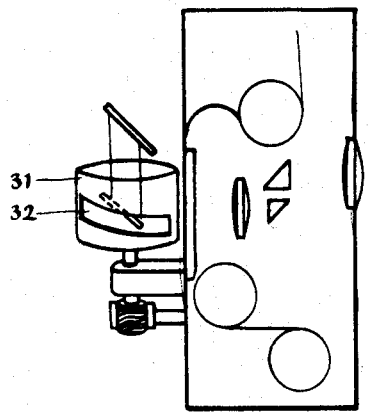
Fig. 6 is an end view of a spiral shutter member mounted on a cylinder.
Figure 7:
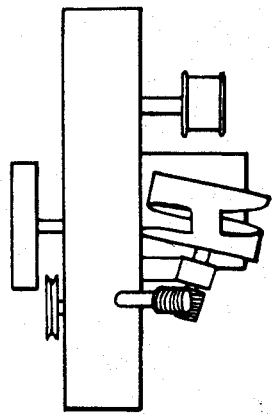
Fig. 7 is a front view of the parts shown in Fig. 6.

A cylinder 31 provided with spiral apertures 32 (Figs. 6 and 7) may be substituted for the cone frustum.

Fig. 8 shows a modification of the apparatus of Fig. 1. It comprises again two lens components 3 and 4 and the oscillating prisms 7 and 27 mounted in the lens inner space.

The prisms are driven as described with reference to Fig. 2.

Besides, this modification comprises a framing means which adjusts the position of the film relatively to the shutter means.

The framing means controls the angular displacement of the film feeding sprocket 34 which is mounted below the film gate 1.

To this effect, the sprocket shaft 35 carries a gear 36 meshing with a worm $37^1$ mounted on a shaft 38.

The worm $37^1$ may be moved along the shaft 38 by means of a fork 39 which is pivoted on a shaft 40. The shaft 40 carries a control knob so that the framing operation is readily made.

On turning the shaft 40 in either direction, the feeding sprocket 34 is rotated on a given angle by means of the worm $37^1$ and the gear 36, whereby the position of the film frame is adjusted relatively to the shutter and the film is correctly registered.

Various modifications may be made in the above described apparatus which is only intended as an example given by way of illustration.

Figure 9:
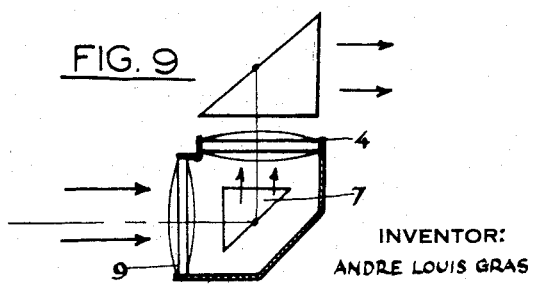
Fig. 9 is a vertical sectional view of another embodiment of the invention.

When short focal lenses are used, the inner space of the lens is smaller. In this case, the lens component 4 is positioned between the prisms 6 and 7, as shown in Fig. 9, so that the prism 6 is outside the lens above the lens component which renders the apparatus more compact, as previously mentioned.

What I claim as new and desire to secure by Letters Patent of the United States is:

In a motion picture projection machine including means for continuously moving a film past a light source, and a film gate, the combination comprising an object lens system including an inlet and an outlet lens, two members having optically coacting reflecting surfaces, at least one of which is disposed intermediate said inlet and outlet lenses, a rotary cam, an arm secured to said one member disposed to be acted on by said cam, means for rotating said cam operatively arranged to be driven by said film moving means, a mounting for said one member and means for adjusting said mounting for movement thereof and of said member along the axis of projection, the position of said arm being substantially parallel with respect to the optical axis.

ADRIEN LOUIS GRAS.

REFERENCES CITED

The following references are of record in the file of this patent:

UNITED STATES PATENTS

| Number | Name | Date |
|---|---|---|
| Re. 17,995 | Mitchell | Mar. 10, 1931 |
| 994,043 | Uebelmesser | May 30, 1911 |
| 1,034,006 | Fetherstone | July 30, 1912 |
| 1,246,217 | Andersen | Nov. 13, 1917 |
| 1,332,238 | Tomlinson | Mar. 2, 1920 |
| 1,432,405 | Messter | Oct. 17, 1922 |
| 1,828,032 | Decaux | Oct. 20, 1931 |
| 1,857,559 | Leon | May 10, 1932 |
| 2,154,809 | Kay | Apr. 18, 1939 |

FOREIGN PATENTS

| Number | Country | Date |
|---|---|---|
| 370,262 | Germany | Mar. 1, 1923 |
| 395,402 | Germany | Jan. 31, 1925 |
| 245,772 | Great Britain | Jan. 6, 1927 |
| 873,206 | France | Mar. 9, 1942 |